United States Patent [19]
Bonne

[11] Patent Number: 6,041,756
[45] Date of Patent: Mar. 28, 2000

[54] ACTIVE ADAPTIVE EGR AND SPARK ADVANCE CONTROL SYSTEM

[75] Inventor: Michael A. Bonne, Berkley, Mich.

[73] Assignee: Chrysler Corporation, Auburn Hills, Mich.

[21] Appl. No.: 09/169,113

[22] Filed: Oct. 8, 1998

[51] Int. Cl.[7] .................................................. F02P 5/00
[52] U.S. Cl. ................... 123/406.29; 123/406.24
[58] Field of Search ................. 123/406.29, 406.24, 123/406.48; 701/111

[56] References Cited

U.S. PATENT DOCUMENTS

| | | |
|---|---|---|
| 4,008,697 | 2/1977 | Konno . |
| 4,128,885 | 12/1978 | Valek et al. . |
| 4,165,722 | 8/1979 | Aoyama . |
| 4,314,540 | 2/1982 | Ikeura . |
| 4,924,840 | 5/1990 | Wade . |
| 5,033,417 | 7/1991 | Van Basshuysen et al. ...... 123/406.29 |
| 5,183,020 | 2/1993 | Hosoi ................................. 123/406.48 |
| 5,241,855 | 9/1993 | Cullen et al. . |
| 5,482,020 | 1/1996 | Shimizu et al. ................... 123/406.48 |
| 5,505,174 | 4/1996 | Komoriya et al. ................ 123/406.48 |
| 5,537,977 | 7/1996 | Hartman et al. . |
| 5,639,961 | 6/1997 | Lautenschutz .................... 123/406.48 |
| 5,704,321 | 1/1998 | Suckewer et al. . |
| 5,749,334 | 5/1998 | Oda et al. . |
| 5,884,605 | 3/1999 | Nagaishi et al. .................. 123/406.29 |
| 5,887,568 | 3/1999 | Takeyama et al. ............... 123/406.48 |
| 5,921,221 | 7/1999 | Davis, Jr. et al. ................ 123/406.24 |

*Primary Examiner*—John Kwon
*Attorney, Agent, or Firm*—Mark Calcaterra

[57] ABSTRACT

The present invention provides a control system for the active adaptive control of exhaust gas recirculation and spark advance for an internal combustion engine automobile. While the automobile is operating, a control algorithm continuously receives data input from various sources such as the driving mode monitor, fuel consumption monitor, engine roughness monitor, and the engine knock monitor. Based on the data, the control algorithm then causes either an EGR command, a spark advance command, both an EGR and spark advance command, or no command at all to be generated so as to optimize the fuel economy of the automobile. This process is repeated until there is no further beneficial effect on fuel economy or engine roughness and/or engine knock is detected.

31 Claims, 1 Drawing Sheet

ACTIVE ADAPTIVE EGR AND SPARK ADVANCE CONTROL SYSTEM

BACKGROUND OF THE INVENTION

1. Field of the Invention

The present invention relates generally to emissions control systems, and more particularly to a control system for the active adaptive control of exhaust gas recirculation and spark advance for an internal combustion engine automobile.

2. Background and Summary of the Invention

The tailpipe exhaust gas of internal combustion engine automobiles generally contains various environmental pollutants such as carbon monoxide (CO), hydrocarbons (HC), and oxides of nitrogen ($NO_x$). In order to reduce the levels of these pollutants, exhaust emission controls in the form of systems, devices, and strategies have been incorporated into most modern automobile designs. These controls work together to reduce the level of pollutants in the exhaust gas emitted from the tailpipe.

Increasing the combustion temperature improves combustion and reduces HC emissions. However, the higher combustion temperature also produces more $NO_x$. For example, when peak combustion temperature generally exceeds 2500° F. (1372° C.), the nitrogen in the air mixes with oxygen to produce $NO_x$. This problem has led to the development of the exhaust gas recirculation system, or EGR system.

The EGR system recirculates a small metered amount (typically 6 to 13 percent) of the hot inert exhaust gases back into the intake manifold. The relatively cooler exhaust gas absorbs heat from the relatively much hotter combustion process. This reduces peak combustion temperature and lowers the formation of $NO_x$.

The EGR system includes a passage between the exhaust manifold and the intake manifold. The EGR valve opens and closes this passage. Thus, the amount of exhaust gas that is recirculated to the intake manifold is controlled by the EGR valve. Such EGR valves can be designed to carefully admit controlled amounts of exhaust gases into the intake manifold. The exact amount required will vary according to several factors, including engine speed and loading. Most modem automobiles employ EGR valves that are operated electronically, typically with the use of a solenoid. A type of EGR valve, known as a linear solenoid EGR valve, allows for a continuously linear variable orifice between the exhaust gas and the intake gas on an internal combustion engine.

Other methods of reducing pollutant levels involves a number of systems that have been developed to alter ignition spark advance to meet most engine operating conditions. One of these methods is spark advance control.

Spark advance causes the spark plug to fire earlier by altering the ignition timing by advancing the distributor or by firing the coil earlier. Typically, the spark plug is fired when the piston is one or more degrees below the top dead center (TDC) position in the cylinder. Most of these systems retard the operation of the vacuum advance unit, when used, or use the engine computer to modify the timing.

Since the introduction of computer engine controls, ignition timing has been precisely controlled by the engine computer. Modern systems use a spark control computer and a number of engine sensors to provide instantaneous timing control. This permits smooth engine operation on diluted fuel-air mixtures.

Although the advent of EGR systems and spark advance control systems have aided in the reduction of pollutants, the lack of precise control and coordination between the two systems has not permitted the attainment of optimal fuel economy with a corresponding acceptable level of emissions control.

Therefore, there exists a need for a system for optimizing the fuel economy of an internal combustion engine automobile by carefully and continuously controlling and coordinating the operation of the EGR system and the spark advance control system.

Accordingly, the present invention provides a control system for the active adaptive control of exhaust gas recirculation and spark advance for an internal combustion engine automobile. While the automobile is operating, a control algorithm continuously receives data input from various sources such as the driving mode monitor, fuel consumption monitor, engine roughness monitor, and the knock system monitor. Based on the data, the control algorithm then causes either an EGR command, a spark advance command, both an EGR and spark advance command, or no command at all to be generated so as to optimize the fuel economy of the automobile. This process is repeated until there is no further beneficial effect on fuel economy or unacceptable levels of engine roughness and/or engine knock are detected.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

The present invention is directed primarily to optimizing the fuel economy of an internal combustion engine automobile that employs an EGR system and a spark advance control system. Specifically, while the automobile is operating, a control algorithm for the EGR system and spark advance control system continuously receives data from various input sources and causes commands to be generated to adjust the EGR system and/or the spark advance control system to obtain the optimal fuel economy possible for that particular automobile. The control algorithm of the present invention is said to be both active and adaptive. By the term "active" as used herein, it is meant that the control algorithm is continuously receiving data and either causing or not causing commands to be generated as a result of processing that data. By the term "adaptive" as used herein, it is meant that the control algorithm is able to compensate for build tolerances and component variation of the internal combustion engine of the particular automobile. Therefore, the control algorithm of the present invention can be used to achieve the optimal fuel economy for any automobile.

Figure 1:
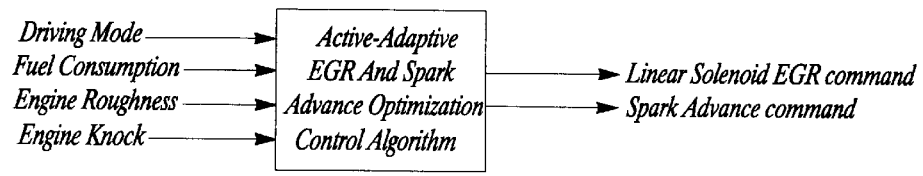
FIG. 1 is a diagrammatic view of a control algorithm for the active adaptive control of exhaust gas recirculation and spark advance for an internal combustion engine automobile, in accordance with one aspect of the present invention.

With reference to FIG. 1, there is shown a diagrammatic view of a control algorithm for the active adaptive control of exhaust gas recirculation and spark advance for an internal combustion engine automobile, in accordance with one aspect of the present invention. Various input sources provide data on the driving mode, fuel consumption, engine roughness, and knock system to the control algorithm. These input sources can be comprised of computers, microprocessors, sensors, and like devices.

Figure 2:
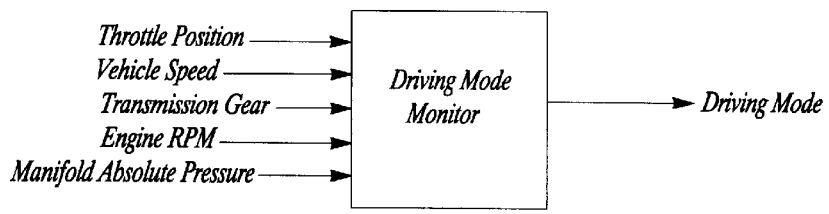
FIG. 2 is a diagrammatic view of the data inputs to a driving mode monitor that determines the driving mode data input for the control algorithm of FIG. 1, in accordance with one aspect of the present invention.

With reference to FIG. 2, there is shown the various data inputs that are provided to a driving mode monitor in order to determine the driving mode. By the term "driving mode" as used herein, it is meant that style of driving that can either be classified as relatively low speed (e.g., city driving or "stop and go" driving where the speed of the vehicle does not generally exceed 30 miles per hour) or relatively high speed (e.g., highway driving or "cruising" where the speed of the vehicle generally exceeds 30 miles per hour). This driving mode data is then provided to the control algorithm. The data inputs to the driving mode monitor include, but are not limited to throttle position, vehicle speed, transmission gear, engine RPM, and manifold absolute pressure (MAP).

The throttle position data is typically provided by the throttle position sensor, or TPS, which monitors the angle change of the throttle valve. The TPS also senses the rate of change to determine how quickly the vehicle is being accelerated.

The vehicle speed data is typically provided by the speedometer, which determines the vehicle speed in miles or kilometers per hour.

The transmission gear data is typically provided by a transmission gear sensor which determines which gear the transmission is currently in.

The engine RPM data is typically provided by an engine speed sensor, which determines the number of revolutions that the crankshaft or camshaft is making per minute.

The MAP data is typically provided by a manifold absolute pressure sensor, which measures the positive pressure in the intake manifold when the engine is running.

Figure 3:
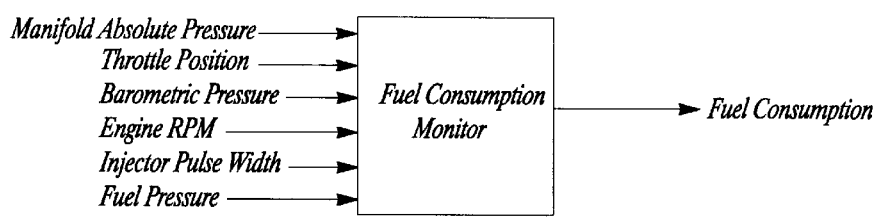
FIG. 3 is a diagrammatic view of the data inputs to a fuel consumption monitor that determines the fuel consumption data input for the control algorithm of FIG. 1, in accordance with one aspect of the present invention.

With reference to FIG. 3, there is shown the various data inputs that are provided to a fuel consumption monitor in order to determine fuel consumption. These data inputs include, but are not limited to MAP, throttle position, barometric pressure, engine RPM, injector pulse width, and fuel pressure.

The barometric pressure data is typically provided by a barometric pressure sensor, which measures atmospheric pressure. Alternatively, the barometric pressure data can be inferred from MAP, TPS, and engine RPM. The input of this sensor is important when the vehicle is driven to higher and lower altitudes.

The injector pulse width data is a parameter typically calculated by the automobile's ECU. Injector pulse width refers to the amount of time during which the injector electronic solenoid is energized, causing the injector to open. Pulse width is a measurement of how long the injector is kept open; the wider the pulse width, the longer the injector stays open. The amount of fuel delivered by a given injector depends upon the pulse width.

The fuel pressure data is typically provided by a fuel pressure gauge or sensor that measures the pressure developed by the fuel pump. However, this value is usually a predetermined and known characteristic of the fuel system design. Typically, the fuel pressure is set at the factory during the manufacturing process.

Figure 4:
FIG. 4 is a diagrammatic view of the data input to an engine roughness monitor that determines the engine roughness data input for the control algorithm of FIG. 1, in accordance with one aspect of the present invention.

With reference to FIG. 4, there is shown the data input that is provided to an engine roughness monitor in order to determine engine roughness. Engine roughness is typically calculated from a time series representation of engine RPM.

The last data input, engine knock, is typically provided by the engine knock monitor which is typically installed in the intake manifold or engine block. Engine knock is usually associated with detonation or pre-ignition, which can cause damage to the piston and valves. The engine knock monitor typically uses a piezoelectric (pressure-produced electricity) ceramic element that produces a voltage proportionate to the strength of the knock. This means a mild knock will send a low voltage signal to the engine's computer, while a heavy knock will send a high voltage signal to the engine's computer. The engine's computer prevents the engine damaging knock from occurring by adjusting the ignition timing.

Of these all of the data monitors, the most important ones are driving mode and fuel consumption. These two monitors are the key to the adjustment of the EGR system and spark advance control system commands that will yield the optimal fuel economy.

With respect to the driving mode monitor, it is intended that this monitor will also function as a discriminator for the control algorithm. In other words, it is preferred that the control algorithm should only be operational when the automobile is at or above a predetermined speed (e.g., highway or cruising speed). By way of a non-limiting example, this speed can be set at 30 miles per hour or more. Therefore, unless the automobile is travelling at or above that predetermined speed, the driving mode monitor will not provide any data to the control algorithm. The control algorithm can be designed so as to be inoperative unless data is provided by the driving mode monitor. Alternatively, the control algorithm can be designed to accept data from the driving mode monitor even if the automobile is not travelling at or above the predetermined speed; however, if the data is accepted by the control algorithm, all other data inputs are blocked thus rendering the control algorithm inoperative.

Once all of this data is gathered by the various monitors, it is then input into the control algorithm. The control algorithm may be contained within a computer, microprocessor, and like devices. The control algorithm then processes the data and determines whether or not an EGR system and/or a spark advance control system command needs to be generated, and if so, what that EGR system and/or spark advance control system command should be. Once the command is generated, an appropriate system, assembly, component, or like device executes the command.

By way of a non-limiting example, when the driving mode monitor indicates a highway speed or cruise condition, this data is provided to the control algorithm. The control algorithm then causes a command to be generated to the effect that the EGR valve is to be opened an incremental amount (e.g., by employing the linear solenoid EGR valve), thus increasing the amount of exhaust gas that is recirculated back into the intake manifold. Alternatively, the command could cause the EGR valve to be closed an incremental amount, thus reducing the amount of exhaust gas that is recirculated back into the intake manifold. The range of authority of the EGR command is preferably limited so as to prevent too much exhaust gas from being recirculated. Additionally, the control algorithm may also cause a command to be generated to the effect that the spark advance is to be adjusted for the lowest fuel consumption possible (e.g., by adjusting the number of degrees from TDC when the spark plug fires) as indicated by the fuel consumption monitor. The range of authority of the spark advance command is preferably limited to prevent the spark plug from firing too many degrees below TDC. It should be noted that it is not mandatory that a spark advance command is to be generated whenever there is an EGR command generated. However, under most circumstances, when there is an EGR command generated, it will typically be beneficial to fuel economy to generate a spark advance command.

This process is repeated until there is no more benefit for fuel consumption or either the engine roughness threshold (preferably predetermined) is exceeded as determined by the engine roughness monitor or engine knock is detected by the engine knock monitor. If engine roughness and/or engine knock is detected, the control algorithm preferably causes commands to be generated to either reduce or increase the level of exhaust gas recirculation and/or to reduce or increase the spark advance so as to reduce the level of, or eliminate the presence of, the engine roughness and/or engine knock.

Once the settings for the EGR system and the spark advance control system are determined for a given engine condition, they are learned by the automobile's ECU and re-used as a starting point of the next time this condition is encountered. For example, these settings can be stored in a computer, microprocessor, or like device for later reference. The intent of the control algorithm of the present invention is to make imperceptible changes to the EGR system and spark advance control system settings so as not to disturb the driver of the automobile.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for optimizing fuel economy for use in combination with an internal combustion engine automobile having an exhaust gas recirculation system and a spark advance control system, comprising the steps of:
   providing a driving mode monitor for determining a driving mode, a fuel consumption monitor for determining fuel consumption, an engine roughness monitor for determining the presence and level of engine roughness, and an engine knock monitor for determining the presence and level of engine knock;
   determining whether a predetermined driving mode is present; and
   adjusting the exhaust gas recirculation system to either increase or decrease the level of exhaust gas recirculation.

2. The control system of claim 1, further comprising the step of determining fuel consumption.

3. The control system of claim 1, further comprising the step of:
   determining the presence and level of engine roughness.

4. The control system of claim 3, further comprising the step of:
   adjusting the exhaust gas recirculation system to either increase or decrease the level of exhaust gas recirculation in order to reduce the level of engine roughness.

5. The control system of claim 3, further comprising the step of:
   adjusting the spark advance control system to either increase or decrease the spark advance in order to reduce the level of engine roughness.

6. The control system of claim 1, further comprising the step of:
   determining the presence and level of engine knock.

7. The control system of claim 6, further comprising the step of:
   adjusting the exhaust gas recirculation system to either increase or decrease the level of exhaust gas recirculation in order to reduce the level of engine knock.

8. The control system of claim 6, further comprising the step of:
   adjusting the spark advance control system to either increase or decrease the spark advance in order to reduce the level of engine knock.

9. The control system of claim 2, wherein the predetermined driving mode requires that the automobile is travelling at least 30 miles per hour.

10. The control system of claim 1, wherein the exhaust gas recirculation system contains a linear solenoid exhaust gas recirculation valve.

11. The control system of claim 1, further comprising the step of:
    adjusting the spark advance control system to either increase or decrease the spark advance.

12. A control system for optimizing fuel economy for use in combination with an internal combustion engine automobile having an exhaust gas recirculation system and a spark advance control system, comprising the steps of:
    determining whether a predetermined driving mode is present;
    determining fuel consumption; and
    adjusting the exhaust gas recirculation system to either increase or decrease the level of exhaust gas recirculation.

13. The control system of claim 12, further comprising the steps of:
    providing a driving mode monitor for determining the driving mode;
    providing a fuel consumption monitor for determining fuel consumption;
    providing an engine roughness monitor for determining the presence and level of engine roughness; and
    providing an engine knock monitor for determining the presence and level of engine knock.

14. The control system of claim 13, further comprising the step of:
    determining the presence and level of engine roughness.

15. The control system of claim 14, further comprising the step of:
    adjusting the exhaust gas recirculation system to either increase or decrease the level of exhaust gas recirculation in order to reduce the level of engine roughness.

16. The control system of claim 14, further comprising the step of:

adjusting the spark advance control system to either increase or decrease the spark advance in order to reduce the level of engine roughness.

17. The control system of claim 13, further comprising the step of:

determining the presence and level of engine knock.

18. The control system of claim 17, further comprising the step of:

adjusting the exhaust gas recirculation system to either increase or decrease the level of exhaust gas recirculation in order to reduce the level of engine knock.

19. The control system of claim 17, further comprising the step of:

adjusting the spark advance control system to either increase or decrease the spark advance in order to reduce the level of engine knock.

20. The control system of claim 12, wherein the predetermined driving mode requires that the automobile is travelling at least 30 miles per hour.

21. The control system of claim 12, further comprising the step of:

adjusting the spark advance control system to either increase or decrease the spark advance.

22. A control system for optimizing fuel economy for use in combination with an internal combustion engine automobile having an exhaust gas recirculation system and a spark advance control system, comprising the steps of:

determining whether a predetermined driving mode is present, the driving mode being determined by a driving mode monitor;

determining fuel consumption, the fuel consumption being determined by a fuel consumption monitor; and adjusting the exhaust gas recirculation system to either increase or decrease the level of exhaust gas recirculation in response to the driving mode monitor and the fuel consumption monitor.

23. The control system of claim 22, further comprising the steps of:

providing an engine roughness monitor for determining the presence and level of engine roughness; and providing an engine knock monitor for determining the presence and level of engine knock.

24. The control system of claim 23, further comprising the step of:

determining the presence and level of engine roughness.

25. The control system of claim 24, further comprising the step of:

adjusting the exhaust gas recirculation system to either increase or decrease the level of exhaust gas recirculation in order to reduce the level of engine roughness.

26. The control system of claim 24, further comprising the step of:

adjusting the spark advance control system to either increase or decrease the spark advance in order to reduce the level of engine roughness.

27. The control system of claim 23, further comprising the step of:

determining the presence and level of engine knock.

28. The control system of claim 27, further comprising the step of:

adjusting the exhaust gas recirculation system to either increase or decrease the level of exhaust gas recirculation in order to reduce the level of engine knock.

29. The control system of claim 27, further comprising the step of:

adjusting the spark advance control system to either increase or decrease the spark advance in order to reduce the level of engine knock.

30. The control system of claim 22, wherein the predetermined driving mode requires that the automobile is travelling at least 30 miles per hour.

31. The control system of claim 15, further comprising the step of:

adjusting the spark advance control system to either increase or decrease the spark advance in response to the driving mode monitor and the fuel consumption monitor.

* * * * *